UNITED STATES PATENT OFFICE.

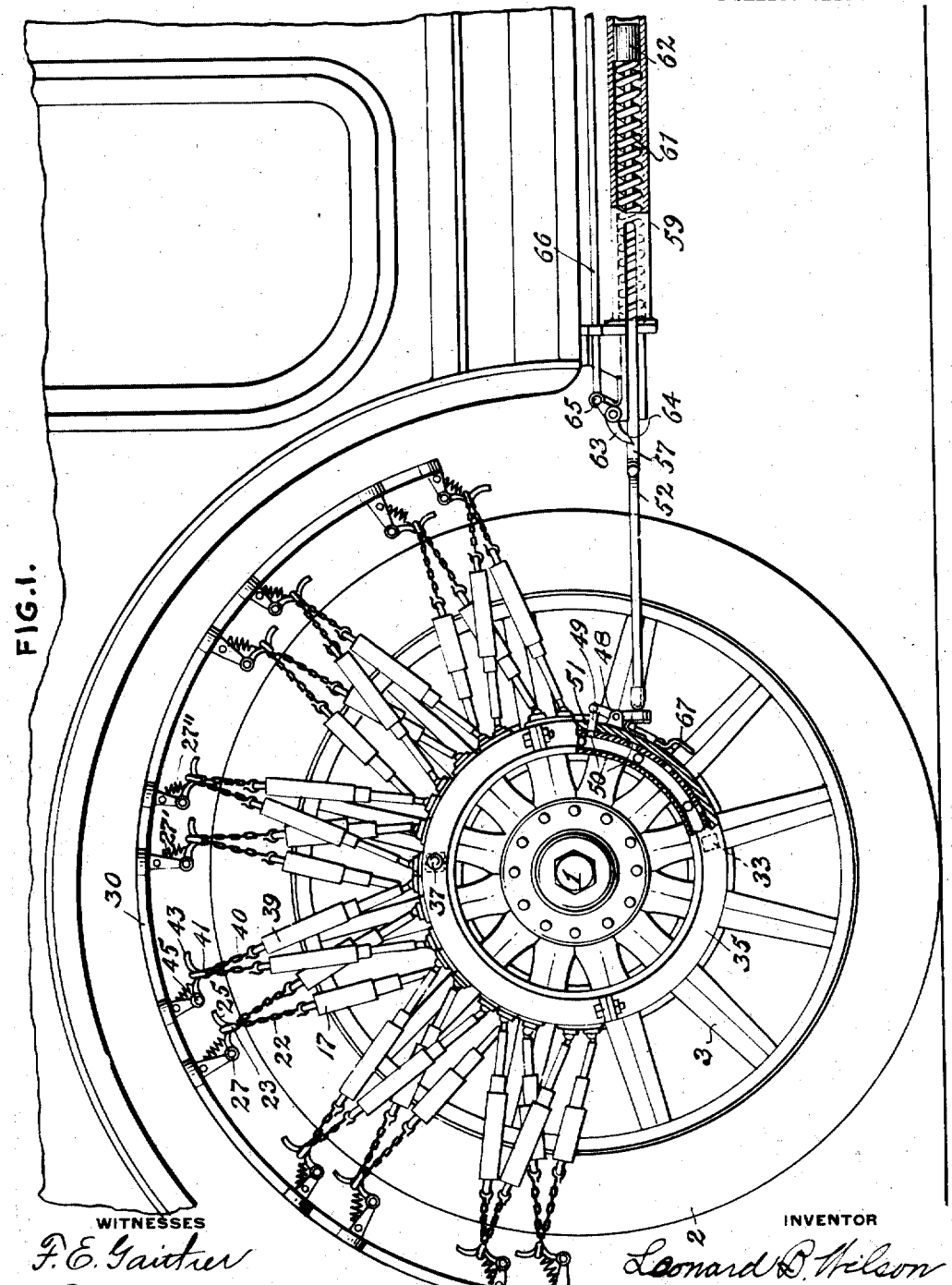

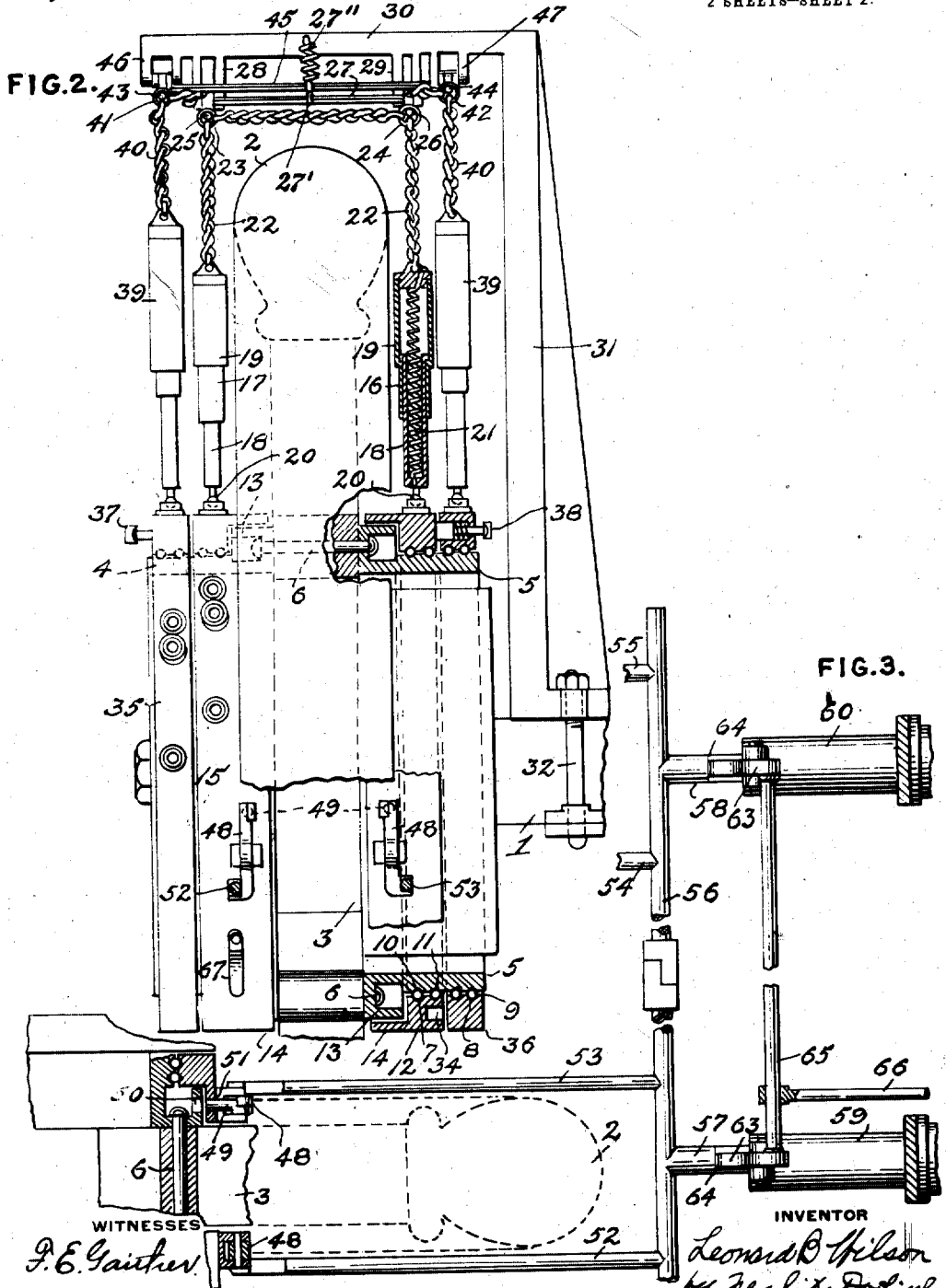

LEONARD B. WILSON, OF BELLEVUE, PENNSYLVANIA.

ANTISKID-CHAIN APPLICATOR.

1,251,607.  Specification of Letters Patent.  Patented Jan. 1, 1918.

Application filed February 25, 1914. Serial No. 821,076.

*To all whom it may concern:*

Be it known that I, LEONARD B. WILSON, a citizen of the United States, residing at Bellevue, in the county of Allegheny and State of Pennsylvania, have invented certain new and useful Improvements in Antiskid-Chain Applicators, of which the following is a specification.

It is customary to apply anti-skid chains on motor vehicle wheels by hand, and this is sometimes a tedious and troublesome operation, particularly during cold and wet weather.

I have provided means whereby the antiskid chains can be applied to the wheels of a motor vehicle by mechanism controlled from the vehicle seat.

One of the objects of my invention is to provide means for supporting an anti-skid chain or chains in such manner that the chain or chains will be temporarily held out of contact with the vehicle wheels for such periods of time as the application of the chains will not be required and so that they may be instantly applied when occasion may demand.

In the drawings:—

Figure 1 is a side elevational view of a rear wheel of a vehicle with my invention applied;

Fig. 2 is a rear view partly in section showing one form of my invention; and

Fig. 3 is a detail view of the operating rods.

The reference numeral 1 designates an axle on which is a wheel 2 of any preferred construction. To the spokes 3 of the wheel are secured bearing rings 4 and 5 which are held in position by the fastening devices 6. The rings 4 and 5 are provided with race-ways, those for the ring 5 being designated 7 and 8. The race-ways receive anti-friction devices shown as balls 9 which are received in race-ways 10 and 11 in the ring member 12.

The rings 4 and 5 are each provided with an inturned flange 13 approximately parallel with the flanges 14 concentric therewith and which is carried by the ring member 12 provided with bolt receiving recesses 34 to be referred to hereinafter.

The ring member 15 is of substantially the same construction as the ring member 12, and each ring carries a plurality of radially disposed chain applying devices, those on the ring member 12 being designated by the reference numeral 16, and those on the ring 15 being designated by the reference numeral 17. The chain applying devices are shown as consisting of telescoping tube members 18 and 19, the lower one of which is connected to its ring by a ball and socket connection 20.

The two members 18 and 19 are held together by a spring 21 and pairs of outer tube members 19 carry the chains 22 preferably provided at intervals with links 23 and 24 to be engaged by the pivoted fingers 25 and 26 on the rod 27. The rods are in the hangers 28 and 29 of the support 30 provided with a standard 31 secured to the axle 1 by fastening devices, as for example 32. In lieu of chains, I may employ straps, cables, or the like, so in such instances that I have referred to chains, I do not limit this invention to the particular chains shown.

Bearing rings 4 and 5 support ring members 35 and 36 corresponding to those designated by the reference numerals 15 and 12. Ring members 35 and 36 are provided with spring pressed bolts 37 and 38 which are adapted to engage the recesses 34 in the ring members 15 and 12.

The rings 35 and 36 are provided with chain applying devices 39 similar to those designated by the reference numerals 16 and 17 on the ring members 12 and 15. The outer members of the chain applying devices carry chains 40 preferably provided intermediate their ends with links 41 and 42 which are engaged by fingers 43 and 44 on spring pressed rods 45 held in hangers 46 and 47 on the support 30.

The flange 14 of the ring 12 is shown as carrying a spring pressed latch 48, the pivoted bolt of which is adapted to enter two alining perforations 50 and 51 in the flanges 13 and 14 so as to lock the ring 12 to the bearing ring 5 and the ring 15 to the bearing ring 4 when the latch is released.

In practice, I prefer to have two of these latches, one on each ring 12 and 15, and they are held out of operative engagement by a fork consisting of the rods 52 and 53 for the one wheel and 54 and 55 for the other wheel. All the rods are connected by a cross rod 56 just with the piston rods 57 and 58 slidable in the tubes 59 and 60, in each of which is a spring 61, one end of which bears against a piston 62 and the other end against the end of its cylinder, the normal tendency of the spring being to retract the forks away from the clutch latches 48.

The forks are held in engagement with the clutch latches by detents 63 which engage notches 64 in the piston rods 57 and 58, these detents being adapted to be operated together through the medium of the cross rod 65. A rod or rods 66 extend from the cross rod to some convenient point on the vehicle so that by pulling the rod 66 to throw the latch or detent 63 out of engagement with the notches 64, the spring 61 will move the fork away from the clutch latch so that the bolt 49 will lock the rings of each inner set together, and the rotation of the wheel will carry the ring members around during its rotation so that the chains 22 will be removed from the fingers and the springs 21 will draw them tight around the tire of the wheel.

As the wheel continues to rotate, the bolt recesses 34 are brought in line with the bolts 37 and 38 so that they will project into the recesses and lock the two ring members on each side of the wheel together, making a complete ring, and as soon as the two ring members are locked together, the rotation of the wheel will be effective in removing the chains 40 from their supporting fingers so that the springs in the members 39 will draw the chains 40 into contact with the tire of the wheel.

When it is desired to remove the chains from contact with the tire of the wheel, the clutch latch 48 may be withdrawn from engagement with the openings 50 and 51 so that the cleat 67 may be passed over the toe thereof to hold the bolt 49 out of engagement with the openings 50 and 51, and the wheel will be turned until the chains 22 are opposite their respective fingers, when the rings may be put back upon the fingers by hand. The bolts 37 and 38 may then be withdrawn so that the ring members 35 and 36 may be returned to their normal position relatively to the ring members 12 and 15, in which position the chains 40 may be engaged by their supporting fingers 41 and 42.

The forks may then be pulled down until they bear upon the rear end of the clutch latch and the detent 63 may be dropped into the notch 64, whereupon the cleat 67 may be swung out of engagement with the latch. The chains will again be in position to be instantaneously applied, simply by removing the detent 63 and permitting their mechanical application.

From the foregoing, it will be observed that the chains may be applied mechanically in an instantaneous manner, and that the device may be attached to a motor vehicle of usual construction without altering the same.

What I claim is:—

1. The combination with a wheel having a bearing ring secured thereto, a chain supporting means spaced from the periphery of the wheel, means for applying anti-skid chains to the tire of the wheel including a ring member detachably engaging the bearing ring, means for connecting and disconnecting said ring members, and spring controlled radial members mounted on the second ring member and engaging the chain.

2. The combination with a wheel having a pair of bearing rings secured to the spokes thereof, a chain supporting means spaced from the periphery of the wheel, means for applying anti-skid chains to the tire of the wheel including a pair of ring members mounted on each bearing ring, said ring members each having spring controlled radial members mounted thereon and engaging the chain, means detachably connecting the inner ring member of each pair with its bearing ring, and means for detachably connecting the outer ring members to the inner ring members.

3. In a device of the class described, the combination of a chain support, spring fingers carried by said support, anti-skid chains engaged by said fingers, means responsive to a part of the vehicle wheel for removing said chains from said fingers, and causing them to contact with the tire of the wheel.

4. In a device of the class described, a pair of ring members, a wheel supported bearing for said ring members, chains supported out of contact with said wheel, devices on the ring members for removing the chains from their support to cause them to engage the wheel tire, and clutch members on one of the ring members for engaging the other ring member to fasten them together.

In testimony whereof, I affix my signature in presence of two witnesses.

LEONARD B. WILSON.

Witnesses:
B. F. FERRIS,
F. E. GAITHER.